June 28, 1932.  G. VALENSI  1,865,064
IONIC RELAY SYSTEM
Filed Oct. 24, 1927  3 Sheets-Sheet 2

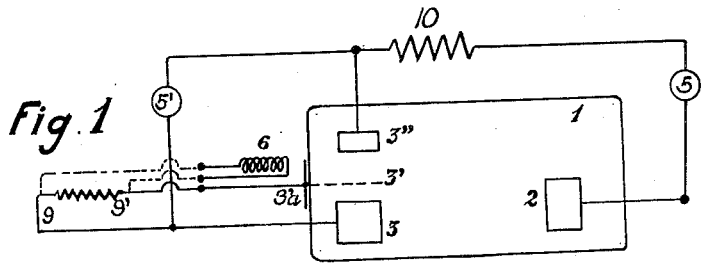
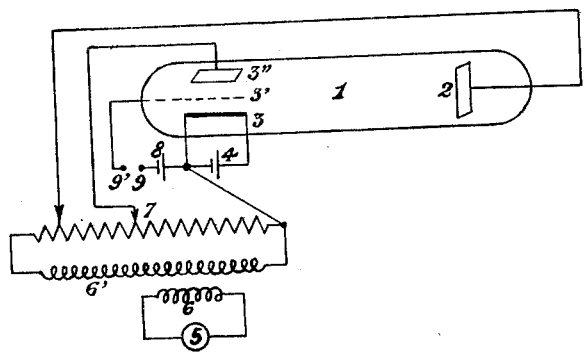
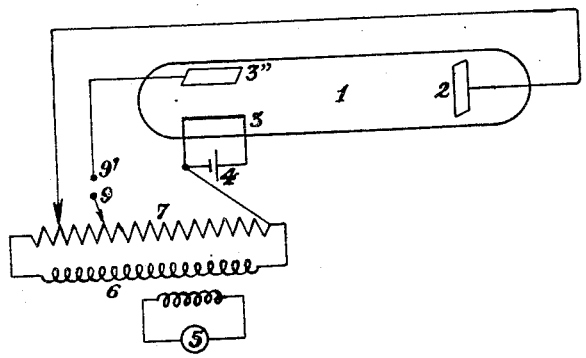

Inventor
Georges Valensi,
By Henry Orth Jr. atty

Patented June 28, 1932

1,865,064

UNITED STATES PATENT OFFICE

GEORGES VALENSI, OF PARIS, FRANCE

IONIC RELAY SYSTEM

Application filed October 24, 1927, Serial No. 228,378, and in France November 18, 1926.

My invention relates to improvements in sensitive ionic relay systems without inertia and utilizing discharge gaps in gaseous atmosphere; such ionic relay systems are suitable for use in connection with strocoscopy, telemechanics, telegraphy, telephony, telephotography, television and the like, with or without wires.

As is well known in the art, the ordinary form of ionic relay system comprises essentially two circuits: an operating circuit and a control circuit. In the operating circuit is inserted a discharge gap in a gaseous atmosphere; the control circuit acts on the electric particles existing in said discharge gap in order to modulate the discharge between the electrodes of said gap, and consequently to vary the intensity of the current in the operating circuit. A discharge gap is generally used in a device made of a vessel filled with a suitable gas or vapor and containing two main electrodes connected to a source of alternating current (for example, of a frequency higher than the modulating frequency); an auxiliary electrode, interiorly or exteriorly disposed with respect to said vessel, is connected to the control circuit and serves to modulate the discharge between said main electrodes, the modulating electromotive force being for example applied between said auxiliary electrodes and one of the main electrodes.

Ionic relay systems according to the above outlined theory necessitate for the modulation a relatively high current when the auxiliary electrode is interiorly disposed and a relatively high voltage when the auxiliary electrode is exteriorly disposed; in any case the control circuit must carry a relatively high power or in other terms, the ratio of the modulating energy (in control circuit) to the modulated energy (in the operating circuit) is never less than one-tenth or so.

The object of my invention is an arrangement for relaying ionically a current, in which the above mentioned disadvantages are overcome. This arrangement embodies three circuits: a primary circuit, an auxiliary circuit, and a secondary circuit.

The secondary circuit, submitted to a suitable electromotive force, is interrupted by a discharge gap situated in a vessel where a vacuum has been made and where has been introduced afterwards a small quantity of a suitable gas or vapor (such as neon, argon, helium, mercury vapor and the like); said electromotive force and said discharge gap are so designed that a discharge can take place between the electrodes of said gap only if some electric particles (which normally are kept away from said gap) are allowed to penetrate into said gap and ionize the atmosphere within said gap (which, for convenience, will be called hereafter "secondary discharge gap").

The auxiliary circuit, submitted to a suitable electromotive force, is interrupted by another discharge gap, which will be called hereafter for convenience "auxiliary discharge gap", and which is situated in the same vessel as the secondary discharge gap, so that the atmosphere of both discharge gaps communicate freely together. A suitable source of electric particles (such as a heated filament, or an electric arc, or an anode emitting positive rays, or a suitable material submited to radiation, or any equivalent device) produces electric particles in the auxiliary discharge gap.

The primary circuit, connected to the source of the current (or tension) to be relayed, is adapted to act electrically (that is to say electrostatically or electromagnetically or both electrostatically and electromagnetically) on said electric particles. Said particles cannot, in normal conditions, reach the secondary discharge gap, whereas they are allowed to escape from the auxiliary discharge gap and to get into the secondary discharge gap when a pulse of the current to be relayed flows in the primary circuit. In this latter case, the atmosphere within said secondary discharge gap becomes electrically less resistant, and the electromotive force applied to the secondary circuit is then able to produce a powerful discharge across said secondary discharge gap.

Consequently the variations of current in the secondary circuit reproduce faithfully, on an amplified scale, the variations of current on the primary circuit. This primary circuit carries only the very small energy necessary for controlling the motion of the electric particles produced with a relatively small power in the auxiliary discharge gap, whereas the secondary circuit carries a large power—so that such an arrangement constitutes an amplifier which is more efficient than the ordinary ionic relay systems as mentioned hereabove. For example with an improved ionic relay system according to my invention it is possible with a voltage of five or ten volts on the auxiliary electrode, to control in the secondary circuit a current of a few amperes, under a voltage of a few thousand volts, which corresponds to a ratio of modulation energy to modulated energy less than one-thousandth.

My invention, not only constitutes a sensitive, powerful and inertialess amplifying device, suitable to telemechanics, telephony, telegraphy and the like, but is also useful in the receiving devices for telephotography or television. In the case of television, it is supposed that, at the distant television transmitting station, a subject is scanned by a very rapidly moving spot of light; the light reflected from the various portions of the subject being successively scanned, produces in a photoelectric cell, electrical variations which are transmitted by radio (or by wire) to terminals inserted in the primary circuit of the ionic relay system according to the invention. The electrical variations, proceeding from the distant television transmitting station, produce across said terminals a varying modulating voltage; for each pulse of said modulating voltage a discharge, and consequently a luminous glow, takes place between the electrodes of the secondary discharge gap so that the ionic system according to the invention converts electrical variations in varying light intensities. If an observer's eye looks, through a suitable scanner, at the gas or vapour contained in said secondary discharge gap, the variations of brilliancy of said gas or vapor will reproduce the variations of light and shade of the subject being scanned at the same moment in the distant television transmitting device.

As a very small energy in the modulating circuit of the system according to the invention is sufficient to modulate without inertia a very powerful discharge in the secondary discharge gap, the picture reproduced at the television receiving station may be projected on a screen seen by many persons at the same time, which constitutes a great improvement in the television art.

The various features of my invention will be obvious to those skilled in the art with reference to the accompanying drawings forming part of this specification and in which:

Fig. 1 represents a diagram illustrating the principles upon which my invention is based;

Fig. 2 is a diagram of a first embodiment of my invention with its various electrical circuits;

Fig. 3 is a similar diagram with the grid element omitted;

Figure 4:
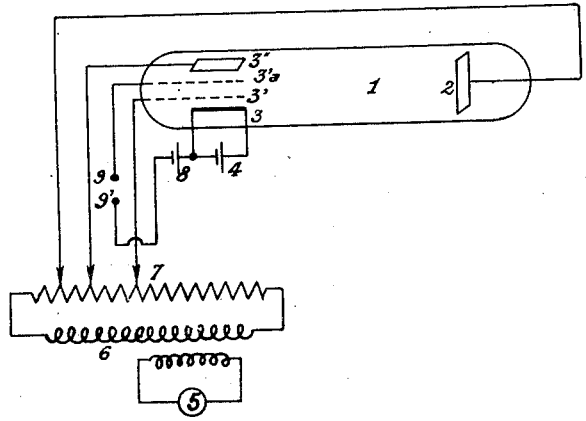
Fig. 4 is a diagram of an arrangement having two grids, both interiorly disposed.

Referring to Fig. 1, a vessel 1 is filled with a gas or vapor at a suitable pressure, said vessel being provided with electrodes 2 and 3'' between which the main discharge takes place under the action of a source of energy 5, the auxiliary discharge taking place between electrodes 3 and 3'' under the action of a source of energy 5'. An internal electrode 3'' and an external electrode 3'a (or only one of them) provide means for electrostatically controlling the said auxiliary discharge. Instead of these electrodes 3 or 3' a coil 6 may be used as a means for controlling the auxiliary discharge electromagnetically. Elements 3', 3'a or 6 may be used alone or in combination and are connected to a modulating circuit. 9, 9' are the terminals where the current (or tension) to be relayed is applied and the source of electrical energy 8 secures a suitable mean potential to the electrodes 3', 3'a relatively to electrode 3. The so-called primary circuit is one of the circuits represented on Figure 1 (9—6—9' in dotted line) or (3—8—9—9'—3'a—3'—3) respectively depending on the method of control of the electric particles (electrostatic or electromagnetic) which is used. The electromotive force 5 in series with the receiving device 10 being too small to maintain the discharge across gap 2—3'' as soon as the electric particles produced in gap 3—3'' are prevented to penetrate into gap 22'', the electrical variations of the tension across 9, 9' are reproduced faithfully on an amplified scale across the terminals of the receiving device 10.

A first embodiment of my invention is illustrated in Fig. 2. A vessel 1 is filled with a gas or vapor of suitable nature and pressure, such as for instance neon, argon, helium and mercury vapor. A plate 2 placed at one end of said vessel constitutes one of the main electrodes for discharging through the gas while the other electrode is formed by a group of elements consisting of a filament 3, heated by a source of current 4, a grid 3' and a plate 3" placed opposite the filament 3.

A source of alternating current 5, whose frequency is for example higher than that of the modulating frequency, feeds the discharge taking place in the vessel 1 by means of a transformer whose primary winding 6 is connected to the source of current 5 and whose secondary winding 6' is connected across a potentiometer 7. One terminal of the said potentiometer is connected to one of the terminals of the filament 3, said filament terminal being the common or neutral point of the arrangement.

At a point near the other terminal of said potentiometer a tap is taken off and connected to the main electrode 2. A second tap is taken off at a suitable interpoint on the said potentiometer and connected to the plate 3".

A terminal 9' is connected to the grid 3' and a second terminal adjacent thereto as shown at 9 is connected to the filament 3 possibly through a source of E. M. F. 8. The tension to be relayed is applied across the terminals 9, 9'. The potential of grid 3' if necessary is raised to a suitable mean value relative to filament 3 by means of the source 8.

The source 5 and the transformer 6 are so designed and the positions of the moving contacts of the potentiometer (heretofore called taps) are so adjusted that the maximum voltage produced by the source 5 and applied to the main electrodes 3" and 2 is not sufficient to produce a discharge between said electrodes, if grid 3' counteracts the flow of current between filament 3 and electrode 3". Furthermore discharge takes place between 2 and 3" at the favorable instant, if at said instant grid 3' allows a flow of current between elements 3 and 3", the favorable instant obviously being the time when element 2 acts as a main anode and element 3" as a main cathode during which time a wave of alternating current is produced by the source 5.

The potentiometer 7 serves as a stabilizing resistance and as a protection against arcs between elements 3" and 2 and between elements 3 and 3".

The alternating potentials of 3" and 2 being taken off the same resistance have necessarily the same phase relation which is a favorable condition for the proper functioning of the arrangement with a good efficiency.

In the case of Figure 2, the primary circuit 3, 8, 9, 9', 3', 3 embodies a heated filament 3 as source of electric particles and a grid 3' as electric means for controlling the motion of said particles. The auxiliary circuit 3, 3", 7, 3 embodies the auxiliary discharge gap 3—3" and a portion of potentiometer 7; the secondary circuit 2, 7, 3", 2, embodies the secondary discharge gap 2—3" and another portion of potentiometer 7. Consequently both discharge gaps have 3" as a common electrode; also the same source of electromotive force 5, feeding potentiometer 7, is used for both the auxiliary circuit and the secondary circuit.

Obviously many variations may be made without departing from the spirit of my invention, a few of which will now be described with reference to the remaining figures.

In Fig. 3, grid 3' has been omitted and the modulating voltage has been arranged to be placed in series or in opposition with the voltage furnished by potentiometer 7, by means of terminals 9, 9' and applied to plate 3". In this case, however, the primary circuit being also the secondary circuit must carry a larger amount of energy, than in the case of Fig. 2.

In Fig. 4 instead of using a group of three electrodes 3, 3', 3" a two grid arrangement (or group of four electrodes) has been employed. The said electrodes consist of a filament 3, a grid 3', a grid 3'a and a fourth electrode 3" affords a reduction of the energy carried by the primary circuit 3, 8, 9', 9, 3'a, 3.

Figure 5:
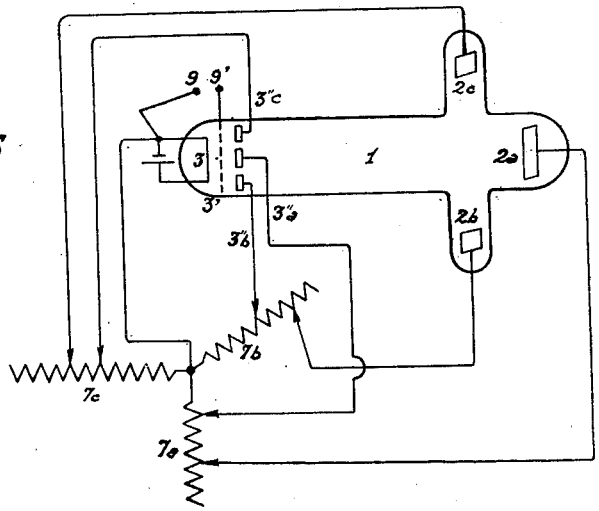
Fig. 5 is a diagram of a polyphase arrangement provided with a plurality of anodes.

In Fig. 5 instead of using one main anode 2, a plurality of anodes have been employed which are fed by a polyphase source instead of the monophase source 5. As shown anodes 2a, 2b, 2c correspond to the electrodes 3"a, 3"b, 3"c disposed about a common grid 3' disposed close to the filament 3. The source of supply for the filament 3 is connected to the neutral point of a star connected potentiometer 7a, 7b, 7c and each of the adjustable contacts thereof are respectively connected to the anodes 2a, 2b, 2c and the intermediate adjustable contacts are connected to the electrodes 3"a, 3"b, 3"c the arrangement being similar to that described in connection with the monophase relay of Fig. 2. This potentiometer 7a, 7b, 7c has its three phases connected respectively to three auxiliary discharge gaps 2a, 3"a, 2b, 3"b,—2c, 3"c— coming successively into action under the control of the same primary circuit 3, 9, 9', 3', 3".

Figure 6:
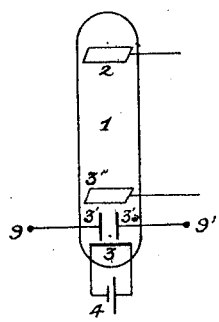

In Fig. 6 instead of acting on the intensity of the electric field applied to the emitting electrode the modulation is produced by varying electrostatically the direction of said electric field in order to deviate the electrical particles and to prevent them from reaching the auxiliary electrode 3".

Figure 7:
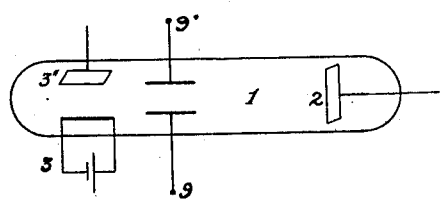
Figs. 6 to 11 are similar diagrams illustrating further applications of the invention.

Fig. 7 shows a modification in which the electrostatic modulation is obtained by a deviation method in which controlling electrodes 3', 3'a are employed which act on the ions produced by an auxiliary discharge the said ions thus being unable to reach the secondary discharge gap that is to say the space between 3′ 3′a and 2.

Figure 8:
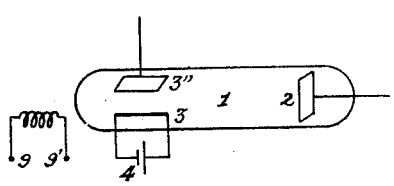

Instead of an electrostatic method of modulation, an electromagnetic method may be employed. If a magnetic field be established perpendicular to the path of the emitted particles, as shown in Fig. 8; it is possible to prevent the said particles from leaving the neighbourhood of the emitting electrode and hence prevent the auxiliary discharge the auxiliary gap 3″3 which affords an electromagnetic control.

Figure 9:
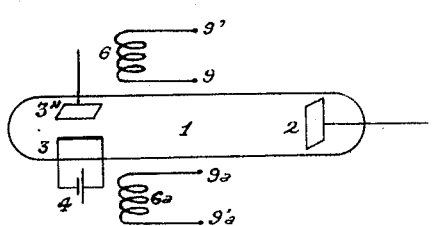

Also, as shown on Figure 9, it is possible by means of a magnetic field (produced by coil 3′b inserted in the primary circuit 9, 3′b, 9′) to prevent or allow, under the control of the current to be relayed, the ions produced by the auxiliary discharge 3—3″ to go beyond the electrode 3″ and penetrate into the secondary discharge gap 3″2.

Since the ionic tubes used in invention are capable of generating alternating current, it is possible to design an ionic tube in which the relay per se will constitute its own generator thus eliminating the source 5 of Fig. 2 or Fig. 4. For this purpose, the well known reflex circuits and the two grid arrangement described in connection with Fig. 4 may be advantageously employed.

All of the above described devices are particularly adaptable for telemechanics, telegraphy, telephony, telephotography, television and the like with or without the use of wires. Many other applications will naturally suggest themselves to those skilled in the art to which my invention appertains.

Figure 10:
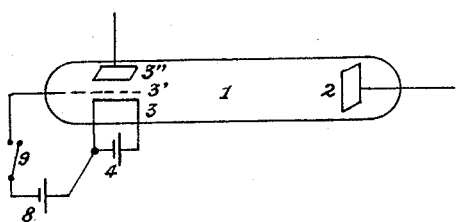

Fig. 10, by way of example, illustrates the device as applied in stroboscopy. The modulating device acting on the auxiliary discharge is embodied in an electric circuit containing a moving switch 9, said switch being controlled by the motion to be studied stroboscopically or moved by a motor of adjustable speed. The intermittent light produced by the main discharge serves as the stroboscopic source of light. This secondary discharge may be fed either directly by a network of alternating current distribution or indirectly therefrom by means of suitably charged condensers.

Figure 11:
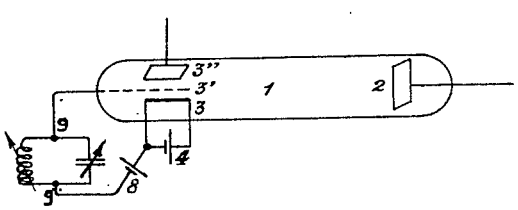

If desired the modulating device acting on the auxiliary discharge in case of stroboscopy may be controlled as shown in Fig. 11 by means of an oscillating circuit 9, 9′ of adjustable frequency.

Having thus described my invention what I claim as new and desire to secure by Letters Patent is:

1. Arrangement for relaying a current ionically comprising in combination, a secondary circuit having a discharge gap in rarefied atmosphere,—an auxiliary circuit also having a discharge gap in rarefied atmosphere, said atmospheres freely communicating,—a source of electromotive force connected to both said secondary circuit and said auxiliary circuit, means for producing electric particles in the discharge gap of said auxiliary circuit, and electrical means, responsive to current to be relayed, for controlling the penetration of said electric particles into the discharge gap of said secondary circuit.

2. Arrangement for relaying a current ionically comprising in combination, a secondary circuit having a discharge gap in rarefied atmosphere, an auxiliary circuit also having a discharge gap in rarefied atmosphere, said atmospheres freely communicating, an electrode common to both gaps, means for producing electric particles in the gap of said auxiliary circuit, and electrical means responsive to the current to be relayed, for controlling the penetration of said electric particles into said discharge gap of said secondary circuit.

3. Arrangement for relaying a current ionically comprising in combination, an auxiliary circuit embodying a portion of a potentiometer connected to a source of electrical energy and a discharge gap in a rarefied atmosphere between a heated filament and an electrode in front of said filament, a secondary circuit embodying a portion of said potentiometer and another discharge gap in rarefied atmosphere between said electrode and a plate, a rarefied atmospheres of both discharge gaps communicating freely together, a primary circuit connected to the source of the current to be relayed and embodying a grid, located between said heated filament and said electrode, said source of electrical energy being so designed, and said potentiometer so adjusted that a discharge takes place between said electrode and said plate only if the current in said primary circuit acting on said grid allows the electric particles produced between said filament and said electrodes to penetrate into the space between said electrode and said plate and ionize the atmosphere of said space.

4. Arrangement for relaying a current ionically comprising in combination three circuits: a secondary circuit connected to a source of electromotive force and embodying a discharge gap in rarefied atmosphere, said gap being so designed that said electromotive force produces a discharge across it only if electric particles, which normally cannot reach said gap, are allowed to reach it and hence to ionize said rarefied atmosphere,—an auxiliary circuit connected to a source of electromotive force and embodying another discharge gap in rarefied atmosphere and means for producing electric particles in said other discharge gap, the atmospheres of the two gaps inserted respectively in said secondary circuit and in said auxiliary circuit communicating freely together,—and a primary circuit connected to the source of the current to be relayed and embodying means acting electrically and directly on said particles for controlling the penetration of said particles into said discharge gap of said secondary circuit in accordance with the variations of said current to be relayed in such a way that said variations are reproduced faithfully on an amplified scale in said secondary circuit.

In testimony that I claim the foregoing as my invention I have signed my name.

GEORGES VALENSI.